Aug. 23, 1927.

E. R. EVANS 1,639,762

INTERNAL COMBUSTION ENGINE

Filed March 5, 1923  2 Sheets-Sheet 1

Inventor
Edwin R. Evans

By Whittemore Hulbert Whittemore
+ Belknap          Attorneys

Aug. 23, 1927.

E. R. EVANS 1,639,762

INTERNAL COMBUSTION ENGINE

Filed March 5, 1923　　2 Sheets-Sheet 2

Inventor
Edwin R. Evans

By Whittemore Hulbert Whittemore
+Belknap
Attorneys

Patented Aug. 23, 1927.

1,639,762

UNITED STATES PATENT OFFICE.

EDWIN R. EVANS, OF DETROIT, MICHIGAN.

INTERNAL-COMBUSTION ENGINE.

Application filed March 5, 1923. Serial No. 623,048.

The invention relates to internal combustion engines and refers particularly to the intake and exhaust manifolds thereof. The invention has for one of its objects the provision of a cylinder block having a series of inlet and exhaust ports and longitudinally extending inlet and exhaust passages communicating respectively with the intake and exhaust ports, these passages having open sides whereby they may be machined to present the minimum obstruction to the flow of the intake or exhaust gases. Another object is to form the intake and exhaust passages in the same side of the cylinder block so that the exhaust gases may be utilized to heat the intake gases. A further object is the provision of a simple closure for the intake and exhaust passages which is provided with a deflector arranged to equally distribute the intake gases to the several intake ports. With these and other objects in view, the invention resides in the novel features of construction and combinations and arrangements of parts as more fully hereinafter set forth.

In the drawings:

Figure 3 is a cross section on the line 3—3 of Figure 2;

Figure 1:
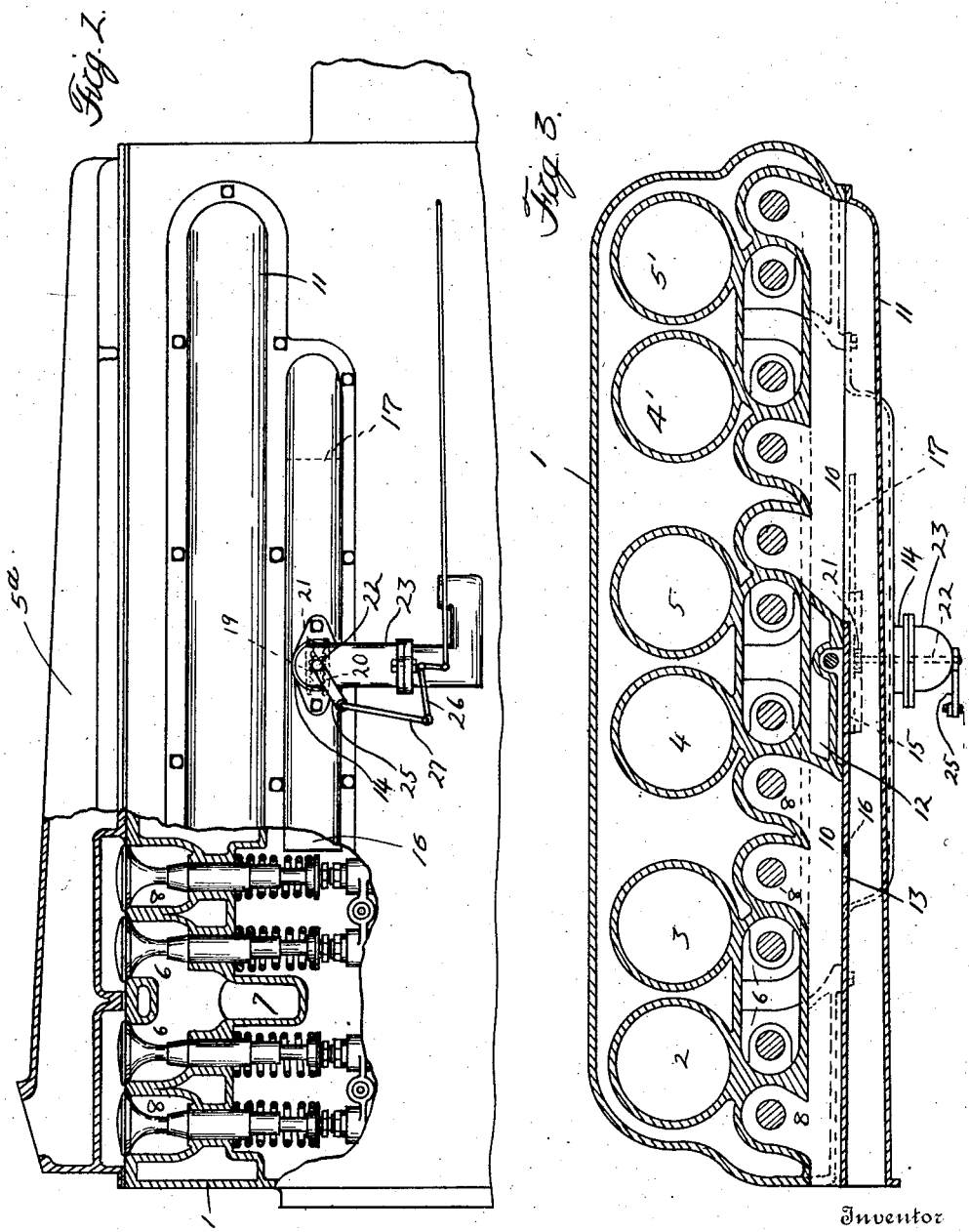
Figure 1 is a sectional side elevation of a portion of an internal combustion engine embodying my invention.
Figure 2:
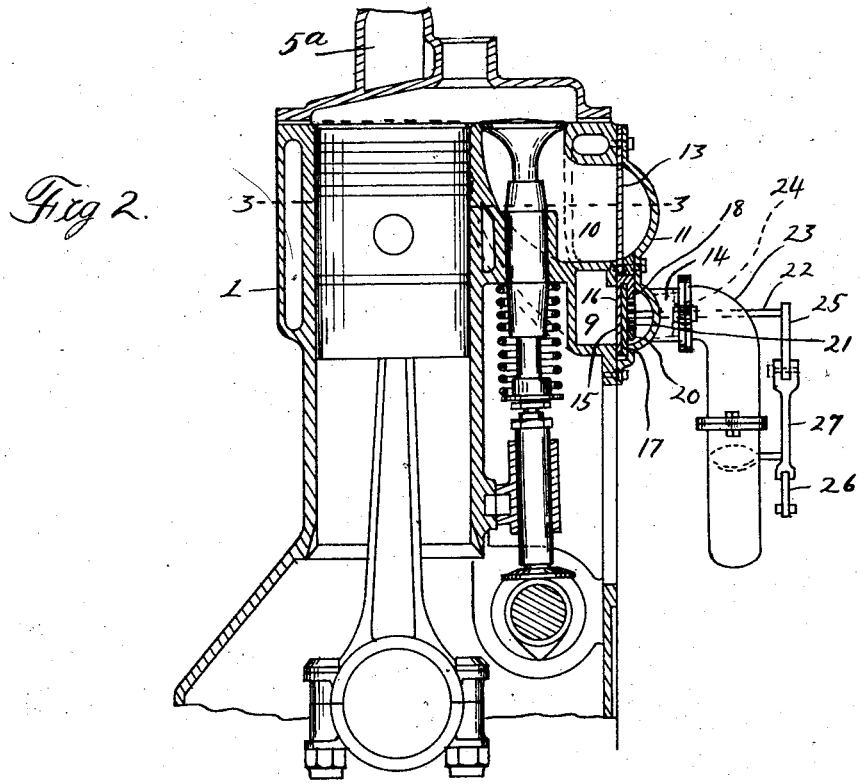
Figure 2 is a transverse section therethrough.
Figure 4:
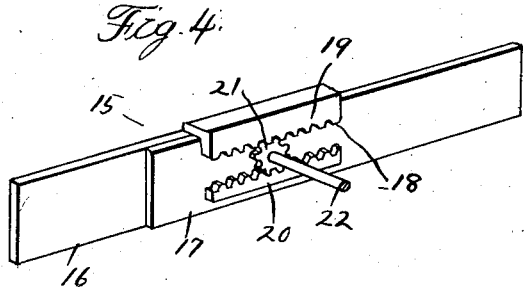
Figure 4 is a perspective view of the intake deflector.

1 is the water jacketed cylinder block of the internal combustion engine having the pairs of cylinders 2—3, 4—5, and 4'—5'. 5ᵃ is the water jacketed cylinder head. The cylinder block is provided with the pairs of valve controlled intake ports 6 adapted to communicate with the pairs of cylinders and communicating with a common vertically extending passage 7 in the cylinder block. The cylinder block is also provided with the valve controlled exhaust ports 8 in alignment longitudinally of the engine with the intake ports 6 and adapted to communicate with the cylinders, the exhaust ports being on opposite sides of the pairs of intake ports. These ports are all arranged so that they may be readily machined before the cylinder head is applied.

The cylinder block 1 is also provided with the longitudinally extending open sided intake and exhaust passages 9 and 10 respectively with the exhaust passage above the intake passage. The intake passage opens into the vertically extending passages 7 leading to the intake ports, and the exhaust passage also opens into vertically extending passages leading to the exhaust ports, these vertically extending passages being curved to present the minimum obstruction to the flow of the intake or exhaust gases. 11 is a closure for the open sided intake and exhaust passages secured to the side of the cylinder block 1, the upper portion of this closure being bulged to form a portion of the exhaust manifold and the lower portion of this closure being bulged to form a portion of the intake manifold.

The cylinder block 1 preferably has the vertically extending water passage 12 located intermediate the ends of the open sided exhaust passage 10, and also the plate 13 secured to the cylinder block and extending from the water passage to the front end of the cylinder block and closing the rear portion of the exhaust passage, whereby the exhaust manifold is divided so that the exhaust gases from half of the engine cylinders are separated from the exhaust gases of the other half of the engine cylinders, thereby increasing the efficiency of the engine. The lower portion of the closure 11 has intermediate its ends the tubular intake 14 to which the carburetor may be secured. For the purpose of distributing the intake gases so that equal amounts thereof will flow into the engine cylinders, I have provided the closure 11 with the deflector 15 extending longitudinally of the cylinder block beyond the water passage 12 thereby preventing the direct flow of the intake gases from the tubular inlet to the vertically extending passage leading to the intake ports of the middle pair of cylinders. This vertically extending passage is fed with intake gases from the portions of the intake passage 9 at opposite ends of the deflector, there being in addition to the suction effect within this vertically extending passage a re-bound effect of the intake passages which occurs upon the closing of the valves of the intake ports of the end pairs of cylinders.

The deflector 15 is made adjustable in length to vary the flow of intake gases to the vertically extending passage communicating with the intake ports of the middle pair of cylinders and this adjustment is made automatic. As shown, the intake deflector comprises the pair of cooperating plates 16 and 17 which are guided between the closure 11 and the cylinder block and close the intermediate portion of the intake passage. These plates are longitudinally slid over each other by means of a pinion and rack construction, the inner plate 16 having the rack 18 adjacent the outer side of the outer plate 17 and carried by a supporting arm 19 extending over the outer plate. The outer plate has the rack 20 on its outer side and extending parallel to and below the rack 18. These two racks are engaged by the pinion 21 mounted upon the shaft 22 suitably journalled in the tubular shaft inlet 14 and also in the induction conduit 23 of the carburetor. As shown, 24 is a spider located in the outer end of the tubular inlet 14 and in which the shaft 22 is journalled. 25 is a lever secured upon the outer end of the shaft 22 and connected to the bell crank lever 26 by the link 27. This bell crank lever is secured to the shaft of the throttle valve so that upon actuation of the throttle valve the plates forming the intake deflector are correspondingly actuated through the mechanism between these plates and the throttle valve.

From the above description, it will be readily seen that I have provided a cylinder block with cored in intake and exhaust passages adjacent to each other having open sides whereby they may be readily machined. Furthermore, that I may use a very simple construction of closure for these intake and exhaust passages, this closure permitting of the use of a sheet metal stamping.

It will also be seen that I have provided a deflector which is adjustable in length to control the flow of intake gases to the intake ports and that this deflector is adjusted automatically by the throttle valve and in accordance consequently with the total flow of intake gases to the manifold.

What I claim as my invention is:

1. In an internal combustion engine, a cylinder block having a series of exhaust ports and an open sided longitudinally extending exhaust passage substantially entirely therewithin, the said exhaust passage being provided with a vertically extending water passage intermediate its ends, a deflector secured to the said water passage, and a closure for said exhaust passage secured to said cylinder block.

2. In an internal combustion engine, a cylinder block having a longitudinally extending series of exhaust ports and a longitudianlly extending open sided exhaust passage substantially entirely within the side of the said cylinder block and communicating with said exhaust ports, and a deflector within the said exhaust passage dividing a portion of the said passage into two longitudinally extending sections.

3. In an internal combustion engine, a cylinder block having a longitudinally extending series of intake and exhaust ports, and longitudinally extending open sided intake and exhaust passages respectively communicating therewith and located adjacent to each other, a fixed deflector within the exhaust passage, an adjustable deflector within the intake passage, and a single closure member for said intake and exhaust passages secured to said cylinder block.

4. In an internal combustion engine, a cylinder block having a longitudinally extending series of intake ports and a longitudinally extending open sided intake passage communicating with said intake ports, a closure member for said intake passage secured to said block and having an inlet intermediate its ends, and a deflector closing said intake passage opposite said inlet in said closure member.

5. In an internal combustion engine, a cylinder block having a longitudinally extending series of exhaust ports and a longitudinally extending open sided passage communicating with said exhaust ports, said block also having a deflector portion intermediate the ends of said exhaust passage, and a closure member for said exhaust passage secured to said block and forming part of the exhaust manifold.

6. In an internal combustion engine, a cylinder block having a series of intake ports, an intake manifold communicating with said intake ports, and an adjustable deflector for distributing the flow of the intake gases to said ports.

7. In an internal combustion engine, the combination with a cylinder block having a series of intake ports, an intake manifold communicating with said intake ports, and an adjustable deflector within said intake manifold for distributing the flow of the intake gases to said ports proportionately in accordance with the total flow of the intake gases in said intake manifold.

8. In an internal combustion engine, the combination with a cylinder block having a series of intake ports, and an intake manifold communicating with said intake ports, of a throttle valve for controlling the flow of the intake gases through said intake manifold, and an adjustable deflector within said intake manifold for dividing the flow of the intake gases to said ports, said deflector being actuated from said throttle valve.

9. In an internal combustion engine, the combination with a cylinder block having a longitudinally extending series of intake ports, and a longitudinally extending open-sided intake passage communicating with said intake ports, a closure member for said intake passage secured to said block and having an inlet intermediate its ends, a longitudinally adjustable deflector closing said intake passage opposite said inlet in said closure member, an induction conduit connected to said inlet, and a throttle valve for controlling the flow of intake gases through said induction conduit connected to said deflector for adjustng the same.

10. In an internal combustion engine, a cylinder block having a series of intake ports, an intake manifold communicating with said intake ports, and an adjustable deflector for distributing the flow of the intake gases to said ports, said deflector including a pair of cooperating plates arranged longitudinally of the passage and adapted for longitudinal sliding movement with respect to each other.

11. In an internal combustion engine, a cylinder block having a series of intake ports, an intake manifold communicating with said intake ports, and an adjustable deflector for distributing the flow of the intake gases to said ports, said deflector including a pair of cooperating plates arranged longitudinally of the passage, a rack on each plate, and means engageable with the said racks for longitudinally adjusting the said plates with respect to each other.

In testimony whereof I affix my signature.

EDWIN R. EVANS.